(No Model.) 6 Sheets—Sheet 1.

J. B. BENTON.
FARE REGISTER.

No. 547,981. Patented Oct. 15, 1895.

WITNESSES:
Gustave Dieterich
H. H. Berrigan Jr.

INVENTOR,
John B. Benton,
BY Betts, Betts & Betts
ATTORNEYS.

(No Model.) 6 Sheets—Sheet 2.

J. B. BENTON.
FARE REGISTER.

No. 547,981. Patented Oct. 15, 1895.

WITNESSES:
Gustave Dieterich
Jno. H. Berrigan Jr.

INVENTOR,
John B. Benton,
BY Betts, Hyde & Betts
ATTORNEYS.

(No Model.)  6 Sheets—Sheet 3.

J. B. BENTON.
FARE REGISTER.

No. 547,981.  Patented Oct. 15, 1895.

Fig. 5.

WITNESSES:
Gustave Dieterich
H. H. Burrigan Jr.

INVENTOR,
John B. Benton,
BY
Betts Hyde Betts
ATTORNEYS.

(No Model.) 6 Sheets—Sheet 4.

J. B. BENTON.
FARE REGISTER.

No. 547,981. Patented Oct. 15, 1895.

WITNESSES:
Gustave Dieterich.

INVENTOR,
JOHN B. BENTON
BY
ATTORNEYS.

(No Model.) 6 Sheets—Sheet 5.

J. B. BENTON.
FARE REGISTER.

No. 547,981. Patented Oct. 15, 1895.

WITNESSES:
Gustave Dieterich

INVENTOR,
John B. Benton
BY
ATTORNEYS.

(No Model.) 6 Sheets—Sheet 6.

J. B. BENTON.
FARE REGISTER.

No. 547,981. Patented Oct. 15, 1895.

WITNESSES:
Gustave Dieterich

INVENTOR,
JOHN B. BENTON,
BY Betts Hyde Betts
ATTORNEYS.

UNITED STATES PATENT OFFICE.

JOHN BRADBURY BENTON, OF NEW YORK, N. Y.

FARE-REGISTER.

SPECIFICATION forming part of Letters Patent No. 547,981, dated October 15, 1895.

Application filed February 24, 1894. Serial No. 501,321. (No model.)

*To all whom it may concern:*

Be it known that I, JOHN BRADBURY BENTON, of New York, in the county of New York and State of New York, have invented certain new and useful Improvements in Fare-Registers for Registering Fares on Cars and other Passenger-Vehicles, of which the following is a full and complete description, reference being had to the accompanying drawings, which illustrate my invention and form a part of this specification.

My invention relates to that class of registers which are fixed in a conspicuous position in the car or other vehicle on which they are used, and which effect a visual registration open at all times to the inspection of passengers and others on the car.

The objects of my invention are, first, to provide a register adapted to register separately the number of transfers taken by the conductor, and also the whole number of fares, inclusive of the transfers; second, to provide a register adapted to record separately the number of transfers and the whole number of fares, inclusive of transfers, taken in each trip, and also the aggregate of transfers and the whole number of fares, inclusive of transfers, taken in successive trips; third, to provide means for preventing the register from being tampered with and partially set back by the conductor or collecting agent to indicate less than the whole number of fares taken in any trip, said means comprising a separable connection which is broken in setting the trip-register back to zero, and a locking mechanism which prevents such broken connection from being restored or re-established until the trip-registers have been fully set back to zero.

With these objects in view my invention comprehends a double register made in two parts or sections, each of which contains a complete registering mechanism, one of said sections being intended to register only transfers (and which I therefore denominate the "transfer" register or section) and the other section the whole number of fares, inclusive of transfers, cash fares, or tickets, (and which, for purposes of description, I denominate the "cash" section. The mechanisms of the two sections are so connected that while the cash-section may be operated independently of the transfer-section to register cash fares or tickets it operates in conjunction with the transfer-section when the latter is operated to register a transfer, the result or effect being that the transfers are registered by both sections, while cash fares or tickets are registered only by the cash-section.

In the accompanying drawings, Fig. 2, a similar view with the face-plates removed; Fig. 3, a broken rear view of the combined tens and hundreds dial-plate of the cash-registering sections, and Fig. 4 a similar view of the units dial-plate of the same section.

I will first describe the construction and operation of that portion of my apparatus which registers the cash fares and tickets as well as the whole number of fares received by the conductor, which portion, as above stated, I denominate the "cash-section," and which in the drawings is marked A. This section comprehends a trip-registering mechanism—that is, a mechanism which registers the whole number of fares received during each trip—which is to be set back to zero at the end of each trip, a total-registering mechanism which registers the total or aggregate number of fares received in successive trips and which moves constantly forward in the same direction, and a direction-indicator to indicate the direction in which the car is traveling, this indicator being connected with the resetting devices in such manner that it is changed to indicate a change of direction whenever the trip-registering mechanism is set back at the end of a trip. These mechanisms are mounted on and supported by two plates $a$ and $a'$, which are hereinafter denominated the "base-plate" and the "rear plate," respectively, and which are bound together and held in fixed relation to each other by spacing-studs $a^2$ and nuts $a^3$. (See Fig. 6.)

Supported in central bearings in the two plates $a$ and $a'$ is a sleeve or hollow shaft $a^8$, which is provided immediately back of the base-plate $a$ with a gear-wheel $a^4$ and back of the rear plate $a'$ with a toothed wheel $a^5$, these wheels being rigid on the sleeve. Between the wheel $a^5$ and the rear plate $a'$, and rigidly secured to the latter, is a wheel $a^6$, which corresponds in size and in the number of its teeth with the wheel $a^5$, being the counterpart thereof. Within the sleeve $a^8$ and projecting therefrom at both ends is a shaft $a^9$, which has fixed on its front end in front of plate $a$ a gear-wheel $a^7$ and on its rear end an arm $a^{10}$, the outer end of which is bent forward into the plane of the wheel $a^5$. The shaft $a^9$ is movable longitudinally and is held normally in its backward position by springs $a^{11}$ between the arm $a^{10}$ and the rear of the register. The arm $a^{10}$ carries at its outer end an inwardly-projecting stud or tooth $a^{12}$, which is normally in engagement with the teeth of wheel $a^5$ and causes said wheel, the sleeve on which it is mounted, the shaft $a^9$, and its connected parts all to rotate together, as hereinafter more fully explained.

Figures 6, 7, 8:
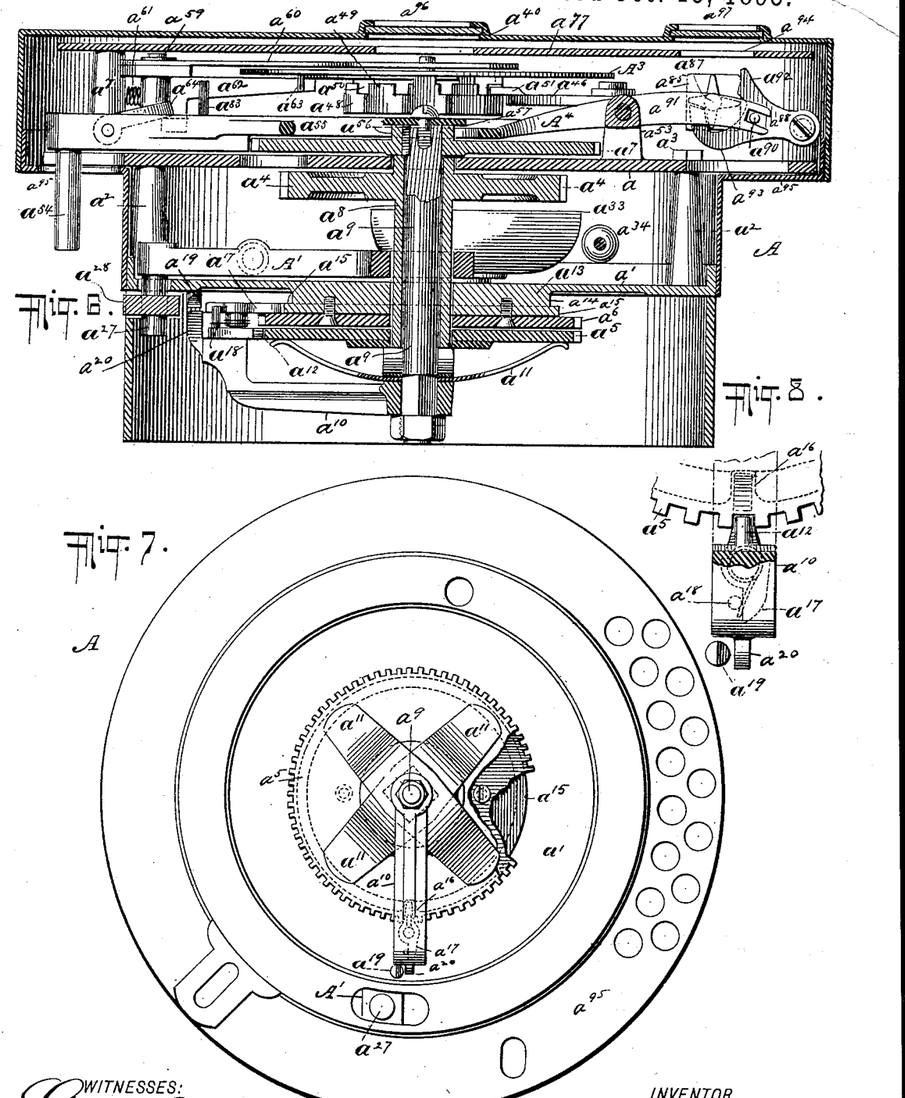
Fig. 6 is a section from front to rear on the line 6 6 in Fig. 5, looking toward the left.
Fig. 7 is a rear view showing the means for locking the trip-registering mechanism out of action while resetting the same.
Fig. 8 is a broken view, on an enlarged scale and partly in section, of said locking mechanism.

The rear plate $a'$ has a thickened portion $a^{13}$, concentric with and somewhat smaller than the wheel $a^6$, and in the peripherical surface of this thickened portion is a circumferential groove or channel $a^{14}$, forming at the rear a flange $a^{15}$, which has formed in it a notch $a^{16}$, as indicated by broken lines in Figs. 7 and 8.

On the forwardly-bent end of the arm $a^{10}$ is mounted a swinging spring-pressed catch $a^{17}$, held normally in radial position by a stop-pin $a^{18}$. In the normal position of the parts this spring-catch rides against the edge of the flange $a^{15}$ and is turned back thereby against the force of its spring and held in an angular position. A longitudinal forward movement of the shaft $a^9$ carries the catch into the plane of the groove $a^{14}$, into which it snaps and locks the parts in this position. Restoration to the normal position is effected by turning the shaft $a^9$ and its arm $a^{10}$ backward to the starting-point, such backward movement being limited by a stop-pin $a^{19}$, which projects from the rear plate $a'$ into the path of a forwardly-projecting lug $a^{20}$ at the outer end of the arm. (See Figs. 6, 7, and 8.) When this limit of movement is reached, the inner end of the catch $a^{17}$, which now stands in its radial position, is opposite the notch $a^{16}$, and the shaft $a^9$ and its connected parts are free to move backward to normal position under the action of the retracting-springs $a^{11}$, the catch $a^{17}$ entering the notch $a^{16}$. On the forward rotary movement of the shaft $a^9$ the catch leaves the notch and is turned back to its angular position by the flange $a^{15}$, against which it rides, as before. The purpose of this mechanism will be explained by the following description: Projecting forwardly from the rear plate $a'$, at one side of the gear-wheel $a^4$, is a stud or pintle $a^{21}$, on which is mounted a ratchet-wheel $a^{22}$, carrying on its front face a rigidly-connected pinion $a^{23}$, which meshes with the gear-wheel $a^4$. (See Fig. 5.)

Figures 1, 11:
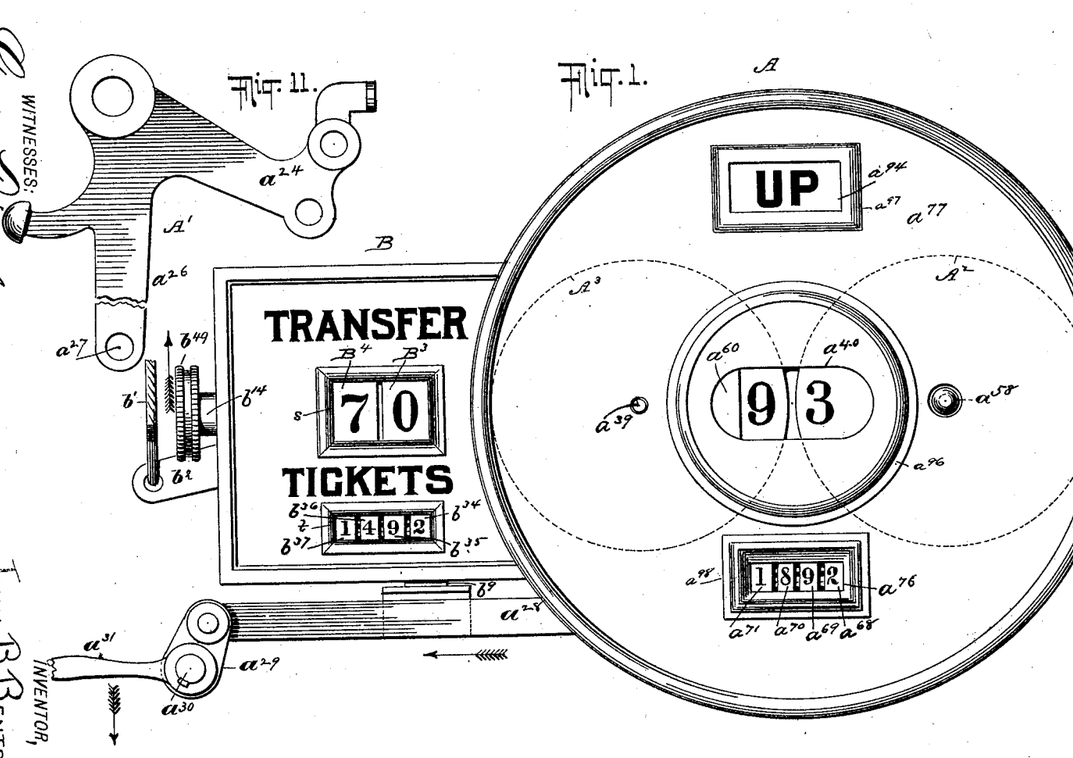
Figure 1 represents a front or face view of a register embodying my invention.
Fig. 11 is a face view of the operating-lever of the cash-section.

A' designates an angular lever shaped substantially as shown in Fig. 11, which is fulcrumed on the sleeve $a^8$ and carries on its arm $a^{24}$ a spring-pressed pawl $a^{25}$, adapted to engage and actuate the ratchet-wheel $a^{22}$. The other arm $a^{26}$ carries a rearwardly-projecting pin or stud $a^{27}$, which extends through a slot provided therefor in the rear plate $a'$, and is coupled with the end of a sliding bar $a^{28}$, the opposite end of which is connected with a crank-arm $a^{29}$ on a shaft $a^{30}$, which runs longitudinally through the car or vehicle on which the register is used. Said shaft is provided with one or more lever-arms or handles $a^{31}$, whereby it is turned to operate the register.

The lever A' is pressed back against the action of the sliding bar $a^{28}$ by a spring $a^{32}$, and the arrangement is such that the ratchet-wheel $a^{22}$ and its connected pinion $a^{23}$ are actuated on the back stroke of the lever. (See Fig. 5.)

$a^{33}$ designates a bell mounted on the rear plate $a'$, and $a^{34}$ is the bell-hammer pivoted on a stud $a^{35}$ and thrown forward toward the bell by a spring $a^{36}$. The hammer-arm is provided with a tooth or projection $a^{37}$, which bears against the teeth of the ratchet-wheel $a^{22}$, whereby the hammer is retracted, and the arrangement is such that the tooth or projection $a^{37}$ escapes from the actuating-tooth of the ratchet-wheel on the completion of the back stroke of the lever A', so that the bell is sounded on the registration of each fare. The bell-hammer thus also forms a friction-stop to prevent overrotation of the ratchet-wheel and the mechanism actuated through the same.

Projecting forward from the base-plate $a$, at opposite sides of the gear-wheels $a^7$, are two studs or pintles $a^{38}$ $a^{39}$, on which are mounted, respectively, the units dial plate or disk $A^2$ and the combined tens and hundreds dial-plate $A^3$ of the trip-registering mechanism. These dial-plates rotate in opposite directions, as indicated by arrows in Fig. 2, and they are of such size that they stand close together. The plate $A^2$, which registers the units of the number of fares taken during a trip, has on its face the nine digits or numerals and a cipher arranged in a circular row concentric with the axis of rotation, equally spaced, and running progressively in a direction opposite the direction of rotation.

The plate $A^3$, which registers the tens and hundreds of the fares taken during a trip, has on its face the series of numbers from "10" to "19," inclusive, also circularly arranged, evenly spaced, and running consecutively in opposition to the direction of rotation. These dials are rotated step by step to bring their numerals successively into view through a sight-opening $a^{40}$ in a face-plate in front of the same.

The operating mechanism through which the dials are rotated is constructed and operates as follows: Back of the dial-plate $A^2$ and rigidly connected therewith is a ratchet-wheel $a^{41}$, and back of said ratchet-wheel and connected therewith in turn is a pinion $a^{42}$, which meshes with the gear-wheel $a^9$, mounted on the front end of shaft $a^9$, as already explained. The arm $a^{24}$ of lever $A'$ carries a second pawl $a^{43}$, which normally engages the ratchet-wheel $a^{41}$ and serves as a stop to prevent forward rotation of the same and of the dial-plate $A^2$, connected therewith.

Figure 13:
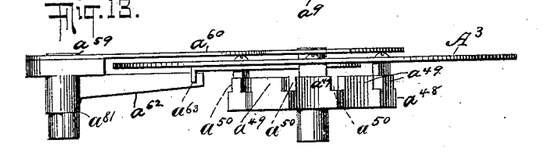
Fig. 13 is an edge view of a movable plate, together with the means for actuating the same, to cover and uncover the hundreds-numerals of the combined tens and hundreds dial of the cash-section.
Figure 14:
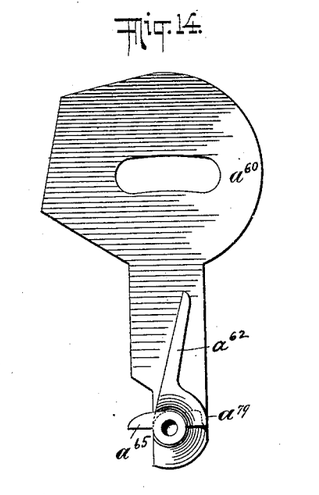
Fig. 14 is an under side or rear face view of said covering-plate.

It will now be understood from the foregoing description that the ratchet-wheel $a^{41}$ and the connected pinion $a^{42}$ are rotated step by step by the lever $A'$ and its pawl $a^{25}$, that the pinion $a^{23}$ imparts rotation to the wheel $a^4$, the sleeve or hollow shaft $a^8$, and the rigidly-connected toothed wheel $a^5$, that the latter, through its connections with the arm $a^{10}$, rotates the shaft $a^9$ and the gear-wheel $a^7$ thereon, and that the wheel $a^7$ rotates the dial-plate $A^2$ through the pinion $a^{42}$, connected therewith. When the lever $A'$ is drawn back by operating the shaft $a^{30}$, the pawl $a^{43}$ is carried away from the ratchet-wheel $a^{41}$ (being prevented from turning toward the latter by a stop $a^{44}$) and the dial-plate $A^2$ is then free to be turned forward to bring the next character thereon into view. The movement of the dial-plate begins as soon as the lever $A'$ is released, so that before the pawl $a^{42}$ returns to its engaging position the point of the ratchet-tooth with which it was before engaged will have passed and the pawl will engage the next tooth and arrest the ratchet-wheel and the dial connected therewith on the completion of the back stroke of the lever, an overrotation of the dial-plate being thus prevented. Above the stud or pintle on which the dial-plate $A^3$ is mounted is another stud or pintle $a^{45}$, on which is mounted a plain or untoothed wheel $a^{46}$, provided on its rear face with a pinion $a^{47}$, which meshes with the gear-wheel $a^7$. At the rear of the dial-plate $A^3$ and rigidly connected therewith is a scalloped wheel $a^{48}$, having in its peripherical surface ten scallops or concavities (see Fig. 3) in which the wheel $a^{46}$ runs to hold the dial-plate stationary and prevent its rotation except at the proper times, as will be explained. On the front face of the scalloped wheel $a^{48}$ is a forwardly-extending rim $a^{49}$, which is notched at the angles between the respective scallops or concavities, as indicated at $a^{50}$ in Figs. 6 and 13, in which notches a radially-projecting arm $a^{51}$ on the wheel $a^{46}$ engages on the completion of each full rotation of the latter, and whereby the scalloped wheel and the connected dial-plate $A^3$ are turned forward one step, the wheel $a^{46}$ being formed with a notch $a^{52}$ opposite its arm $a^{51}$ (see Fig. 5) for the reception of the angles between the scallops to permit the forward movement of the scalloped wheel. Thus on the completion of each full rotation of the wheel $a^{46}$ the scalloped wheel and its connected dial-plate are turned forward one step or one-tenth of a rotation to bring the next higher number on the dial into view through the sight-opening $a^{43}$.

The ratchet-wheel $a^{22}$ has ten teeth, the pinions $a^{23}$ and $a^{41}$ have an equal number of teeth, and the scalloped wheel $a^{48}$ has ten scallops, from which it follows that the units dial-plate $A^2$ and the wheel $a^{46}$ are rotated synchronously through one-tenth of a rotation at each operation of the lever $A'$, and that each full rotation of the wheel $a^{46}$ produces one-tenth of a rotation of the dial-plate $A^3$, whereby the tens are transferred or "carried" from the dial $A^2$ to the dial $A^3$. The means for registering the hundreds will be hereinafter explained.

On the completion of each trip of the car or other vehicle on which the register is used the registering mechanism is to be set back to zero preparatory to the next trip.

The resetting mechanism is constructed and operates as follows: $A^4$ designates a lever fulcrumed in ears or lugs $a^{53}$ $a^{53}$, projecting forwardly from the base-plate $a$, (see Figs. 5 and 6,) which lever is provided at its free or swinging end with a push-pin $a^{54}$, which projects rearwardly through an opening provided therefor in the base-plate and in the case which incloses the registering mechanism. At a proper point in its length the lever is formed with an eye or opening $a^{55}$ for the reception of a hub or boss $a^{56}$ on the wheel $a^7$, to which it is coupled by means of a plate or washer $a^{57}$, secured on the end of shaft $a^9$ and overlapping the lever. As before stated, the shaft $a^9$ is movable longitudinally in the sleeve $a^8$ and is held in its rearward position by the springs $a^{11}$, the tooth $a^{12}$ on the arm $a^{10}$ being then in engagement with the teeth of wheel $a^5$. The lever $A^4$ being swung forward by pressure applied to its push-pin $a^{54}$, the wheel $a^7$, the shaft $a^9$, on which it is mounted, and the arm $a^{10}$, carried by said shaft, are all moved forward, the wheel $a^5$ and the arm $a^{10}$ being thereby disconnected. The same movement carries the spring-catch $a^{17}$ forward beyond the flange $a^{15}$ and permits it to be thrown by its spring into the circumferential groove $a^{14}$, whereby the parts are locked and prevented from returning to normal position under the influence of the springs $a^{11}$ when the lever $A^4$ is released. It will be noted that when the tooth $a^{12}$ is withdrawn from the teeth of wheel $a^5$ it engages those of the fixed wheel $a^6$, so that it is necessary to swing the lever $A^4$ far enough to carry the tooth $a^{12}$ entirely through and beyond the teeth of wheel $a^6$. This having been done, the registering mechanism is entirely disconnected from the actuating devices and is free to be turned backward to the zero or starting point. The backward rotation is effected by means of a thumb-piece or button $a^{58}$, projecting from the dial-plate $A^2$ through an opening in the face-plate, (see Fig. 1,) and is continued until it is arrested by the lug $a^{20}$ coming in contact with the stop-pin $a^{19}$, as already explained. When this position is reached, the two dial-plates will have reached the zero-point, the catch $a^{17}$ will stand opposite the notch $a^{16}$ in the flange $a^{15}$, and the shaft $a^9$ and its connected parts will be free to return to normal position under the influence of the retracting-springs $a^{11}$.

It will be understood from the foregoing that as soon as the shaft $a^9$ is moved longitudinally forward far enough to carry the spring-catch $a^{17}$ off the edge of the flange $a^{15}$ the said catch will snap into the circumferential groove $a^{14}$ and lock the parts against a return movement until turned back to the zero position; also, that a partial forward movement of the shaft $a^9$ not only disconnects the registering mechanism from the actuating mechanism by removing the tooth $a^{12}$ from the toothed wheel $a^5$, but also locks the entire mechanism against either forward or backward movement by bringing said tooth into engagement with the fixed wheel $a^6$. It will also be noted that if the resetting mechanism be tampered with at all it will be necessary to set the register back to zero, and that it cannot be left in an intermediate position without detection, for the reason that the operative connections having once been broken they can only be re-established at the zero-point.

The mechanism for registering the hundreds is constructed and operated as follows: On a stud or pintle $a^{59}$ below the dial-plate $A^3$ is mounted a swinging plate $a^{60}$, which overlaps the said dial-plate and is held normally toward the right, in the position indicated in Fig. 2, by a spring $a^{61}$, in which position it covers the left-hand or hundreds character of the number opposite the sight-opening $a^{40}$, so that only the units and tens characters are exposed to view, as shown in Fig. 1. On the hub of the swinging plate $a^{60}$, back of the dial-plate $A^3$, is an upwardly-extending arm $a^{62}$, which projects into the path of a stud or projection $a^{63}$ on the back of the dial-plate, the arrangement being such that at the proper point in the rotation of the dial-plate the stud $a^{63}$ will strike the arm $a^{62}$ and turn it and the connected plate $a^{60}$ back toward the left far enough to uncover the hundreds character on the dial, the said tooth then passing the arm $a^{62}$. When the plate $a^{60}$ is turned back, as explained, to uncover and expose the hundreds character, a pawl $a^{64}$, pivoted at the side of the lever $A^4$, (see Figs. 2, 5, and 6,) drops into engagement with a stop-lug $a^{65}$ on the hub of the plate $a^{60}$ and holds the latter in its retracted position. When the lever $A^4$ is thrown forward preparatory to resetting the register, the pawl $a^{64}$ is carried out of engagement with the lug $a^{65}$ and the plate is returned to normal position by its spring $a^{61}$, the stop-lug $a^{65}$ passing under the end of the pawl $a^{64}$. When the lever $A^4$ is released after resetting the register, it returns to normal position, as already explained, the pawl resting on the stop-lug $a^{65}$, (see Fig. 6,) ready to drop into engagement when the plate is again turned back. The register being set to zero, the parts will be in the relative positions shown in Fig. 2, the two ciphers on the units and tens dials being exposed through the sight-opening and the hundreds character covered by the plate $a^{60}$. The dial-plate $A^3$ will remain stationary in the zero position until nine fares have been registered on the dial $A^2$. The registration of the tenth fare will complete the first rotation of the units-dial and bring the cipher thereon back into view. At the same time the wheel $a^{46}$ will complete a full rotation, and by the engagement of its tooth $a^{51}$ with the notch $a^{50}$ in the scalloped wheel $a^{48}$ will turn the latter and the connected dial-plate $A^3$ forward one step, bringing the first digit in the tens row into view simultaneously with the cipher in the units row. The register now registers "10," and it will continue to register units and tens until the dial-plate $A^3$ completes a full rotation, at which time the plate $a^{60}$ is turned back to uncover the hundreds row and remains in this retracted position until the register is set back to zero, when it is released and returned to normal position, as above explained.

The capacity of this trip-register is one hundred and ninety-nine fares, this being sufficient on most roads under ordinary circumstances. In extraordinary cases, when greater capacity is required, the difficulty may be met by setting back to zero when the registering capacity is exhausted and making a new or additional registration for the balance of the trip. Inasmuch as the setting back would have to be done in the presence of all the passengers on the car, there would be slight danger of a failure on the part of the conductor to make full returns in such cases, and even should he fail to do so the total or permanent register hereinafter described would report the fact and inevitably lead to detection.

The total or permanent register of the cash-section—that is, the register which registers the whole number of fares taken and registered in successive trips—will now be described.

On the lower part of the base-plate $a$ are two forwardly-projecting lugs or ears $a^{66}$ $a^{66}$, which support a transverse pin or arbor $a^{67}$, on which are rotatably mounted a series of registering-wheels $a^{68}$ $a^{69}$ $a^{70}$ $a^{71}$, each bearing on its peripherical surface the nine digits or numerals and a cipher, equally spaced and running in numerical order and in the same direction on all the wheels. (See Fig. 2.) The drawings show four of these register-wheels; but it is evident that a greater or less number may be used, according to the registering capacity desired. The capacity of the four wheels illustrated is nine thousand nine hundred and ninety-nine fares. By adding a fifth wheel it would be increased tenfold, while by taking off the fourth wheel it would be correspondingly reduced. The first or units wheel $a^{68}$ of the series has connected with it a bevel-gear $a^{72}$, which meshes with and is driven by a corresponding gear $a^{73}$, mounted on a stud or pintle $a^{74}$, projecting forward from the base-plate $a$. Back of the bevel-gear $a^{73}$ and connected therewith is a pinion (not shown) which is driven from the gear-wheel $a^{4}$ through an intermediate gear-wheel $a^{75}$, mounted on an arbor projecting from the plate $a'$. These several gears and pinions are so proportioned relatively to each other that each forward movement or impulse of the wheel $a^{4}$ will turn the register-wheel $a^{68}$ through one-tenth of a rotation to bring the numerals thereon successively into view through a sight-opening $a^{76}$ in the face-plate $a^{77}$. (See Fig. 1.)

Figures 2, 3, 4:
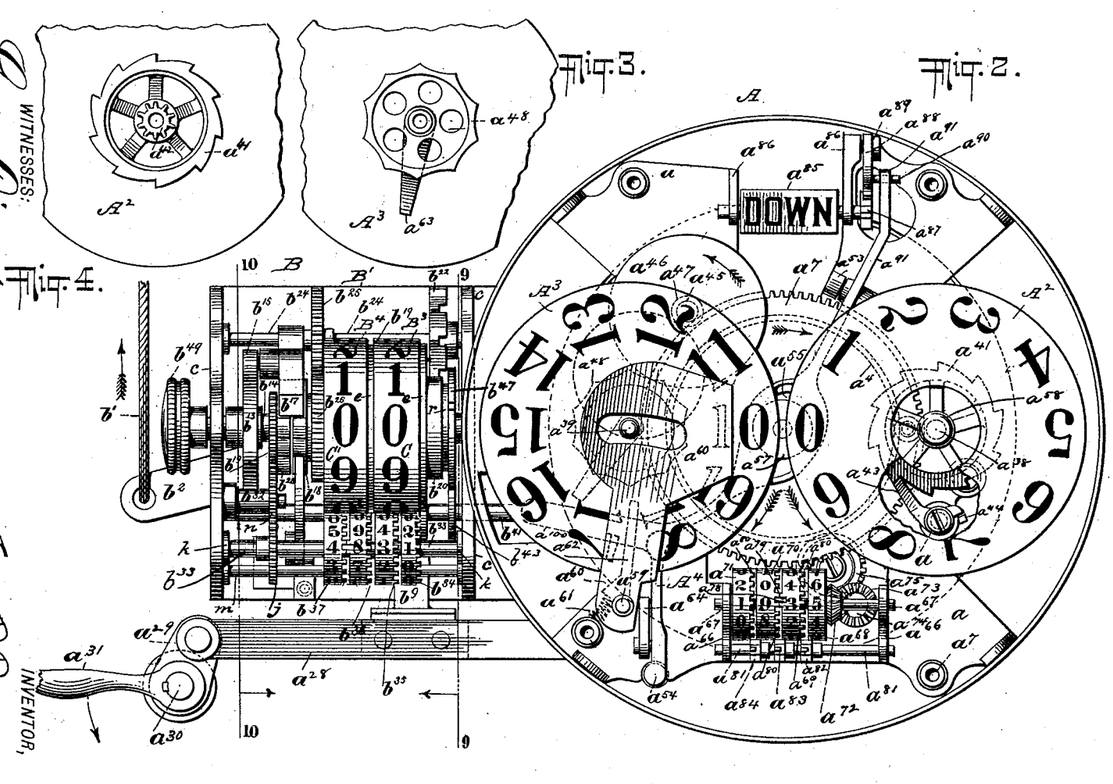

In the left-hand side or edge of the rim of each of the register-wheels $a^{68}$ $a^{69}$ $a^{70}$ is formed a notch, such as shown at $a^{78}$ in Fig. 2, and at each side of said notch a tooth $a^{79}$, which teeth project beyond the edge of the rim toward the adjacent wheel, as shown, and on the right-hand side or edge of the rim of each of the wheels $a^{69}$ $a^{70}$ $a^{71}$ are twenty crown-teeth $a^{80}$. Mounted, also, in the lugs or ears $a^{66}$ $a^{66}$, outside of or beyond the register-wheels $a^{68}$ $a^{69}$ $a^{70}$ $a^{71}$, is a transverse rod or arbor $a^{81}$, which sustains three independently-rotatable cog-wheels $a^{82}$ $a^{83}$ $a^{84}$, located opposite the respective spaces between the register-wheels. Each of these cog-wheels has teeth of different width, every alternate tooth being adapted to pass the plain portion of the register-wheel at the right and to engage the teeth of that at the left, while the remaining teeth are of such width that while they are adapted to enter between and engage the teeth of the register-wheel at the left they are too wide to pass the plain portion of that at the right and can only engage the notched portion of the latter. The narrow teeth are, however, of such width that they stand in the path of the teeth $a^{79}$ of the register-wheel at the right, and therefore on the completion of a full rotation of any register-wheel the cog-wheel immediately at the left thereof will be turned forward one step.

The operation of this registering mechanism is as follows: Beginning at the right with the units and tens register-wheels $a^{68}$ $a^{69}$ and the cog wheel $a^{82}$, a narrow tooth of the latter is normally in engagement with the teeth of the tens-wheel $a^{69}$, while the next succeeding tooth of the cog-wheel, which is one of the wide teeth, stands in front of the units-wheel $a^{68}$ and overlaps the plain or unnotched portion of the rim thereof. On the completion of a full rotation of the units-wheel $a^{68}$ the advance tooth $a^{79}$ thereon will engage that tooth of the cog-wheel which is in engagement with the tens register-wheel $a^{69}$ and turn the cog-wheel forward, the wide tooth entering the notch $a^{78}$ in the units-wheel and engaging also the teeth of the tens-wheel $a^{69}$, whereby the latter is also turned forward. Before the wide tooth of the cog-wheel leaves the notch $a^{78}$ in the units-wheel $a^{68}$ and the teeth of the tens-wheel $a^{69}$ the next narrow tooth of the cog-wheel will have engaged the teeth of the tens-wheel and the forward movement of the latter will continue until the wide preceding tooth is carried out of engagement with both of said register-wheels, when the tens-wheel comes to rest and remains stationary until the units-wheel completes another rotation, when the operation described will be repeated.

It will thus be seen that on the completion of each full rotation of the units-wheel the tens-wheel will be turned forward through an angular distance corresponding with two of its teeth, or one-tenth of a rotation, every tenth unit being thus carried over and registered on the tens register-wheel. In like manner a full rotation of the tens register-wheel $a^{69}$ will, through the cog-wheel $a^{83}$, effect one-tenth of a rotation of the hundreds-wheel $a^{70}$, and a full rotation of the latter will, through the cog-wheel $a^{84}$, effect one-tenth of a rotation of the thousands-wheel $a^{71}$, the operations being precisely the same throughout the series as described with reference to the units and tens wheels, a full rotation of any register wheel of the series producing one-tenth of a rotation of the next wheel of higher order.

It will be further observed that by reason of the teeth of the register-wheels $a^{69}$ $a^{70}$ $a^{71}$ being constantly in engagement with the teeth of the respective cog-wheels $a^{82}$ $a^{83}$ $a^{84}$, and by reason of the wide teeth of the cog-wheels being unable to pass the unnotched portions of the rims of the wheels $a^{68}$ $a^{69}$ $a^{70}$, and by reason of the units-wheel $a^{68}$ being constantly in engagement with the actuating-gear, it is impossible to tamper with the register or to set either of the register-wheels either forward or backward surreptitiously, the whole train being positively geared together and incapable of being disconnected.

This total or permanent registering mechanism just described turns constantly forward in the same direction and is not intended to be reset. No provision is therefore made for disconnecting it from the driving-gear except by taking the whole register apart. Its capacity having been exhausted by registering up to nine thousand nine hundred and ninety-nine, the next operation brings the whole series of register-wheels back to zero, which thus indicates "10,000," after which a new registration begins.

My direction-indicator, which shows the direction in which the car is traveling, comprises a four-sided block $a^{85}$, journaled in lugs or ears $a^{86}$ $a^{86}$, projecting forward from the base-plate $a$ at or near the top thereof. On one of the journals of this indicator is a four-toothed wheel $a^{87}$, which is actuated by a swinging or vibrating lever $a^{88}$, pivoted at $a^{89}$ and connected by means of a laterally-projecting pin $a^{90}$ with an arm $a^{91}$ of the lever A$^4$, (see Figs. 2, 5, and 6,) whereby when the lever A$^4$ is operated in the act of resetting the trip-register, as above explained, the lever $a^{88}$ is vibrated. The lever $a^{88}$ has two arms $a^{92}$ $a^{93}$ of unequal length adapted to engage opposite teeth of the wheel. The arm $a^{93}$, which is the longer arm of the two, is bent at its outer end, as shown in Fig. 6, and the two arms stand normally on opposite sides of the respective teeth of wheel $a^{87}$ with which they engage. When the lever A$^4$ is pushed forward preparatory to resetting the trip-register the lever $a^{88}$ is swung backward or downward, as viewed in Fig. 6, whereby the arm $a^{92}$, acting on a tooth of the wheel $a^{87}$, turns the latter and the indicator $a^{85}$ forward far enough to bring the next preceding tooth of the wheel $a^{87}$ into the path of the arm $a^{93}$, so that on the return movement of the levers A$^4$ $a^{88}$, after resetting the register, an additional movement of the indicator will be effected and a quarter rotation thereof completed to bring the next side or face full toward the sight-opening $a^{94}$ in the face-plate $a^{77}$. The next operation of the resetting-lever A$^4$ of course repeats these operations, the indicator being thereby turned forward another quarter-rotation to bring the next face thereof into view, and so on. As illustrated in the drawings, this indicator is adapted to a line or road on which the car runs back and forth and where the legends "Up" and "Down" appropriately indicate the direction in which the car travels.

It will be understood from the foregoing description that the two legends whereby direction is indicated are carried on adjacent faces of the block $a^{85}$, and that opposite faces carry the same indication. Manifestly, however, where the apparatus is to be used on a "belt line" or other circuitous route the indications or legends on the four sides of the block may be changed to meet the requirements—as, for example, "East," "West," "North," and "South," following each other in appropriate order.

The mechanism thus described is inclosed in a suitable casing, made preferably of sheet metal in circular form, larger at the front than at the rear, with a square shoulder or offset $a^{95}$ immediately in rear of the base-plate $a$, through which offset the push-pin $a^{54}$ projects to the exterior, as shown in Fig. 6, for convenient manipulation in resetting the register. The case may be made in separate parts or sections secured together and to the base and rear plates in any appropriate manner or by any suitable or preferred means, these features constituting no part of the invention claimed herein. The front plate of this casing, which overlies the face-plate $a^{77}$, is provided opposite the sight-openings in the latter with glazed apertures or windows $a^{96}$ $a^{97}$ $a^{98}$, (see Figs. 1 and 6,) through which the registrations and the direction indications may be seen. Manifestly the face-plate $a^{77}$ might be dispensed with without in any way impairing the utility of the apparatus.

Figure 5:
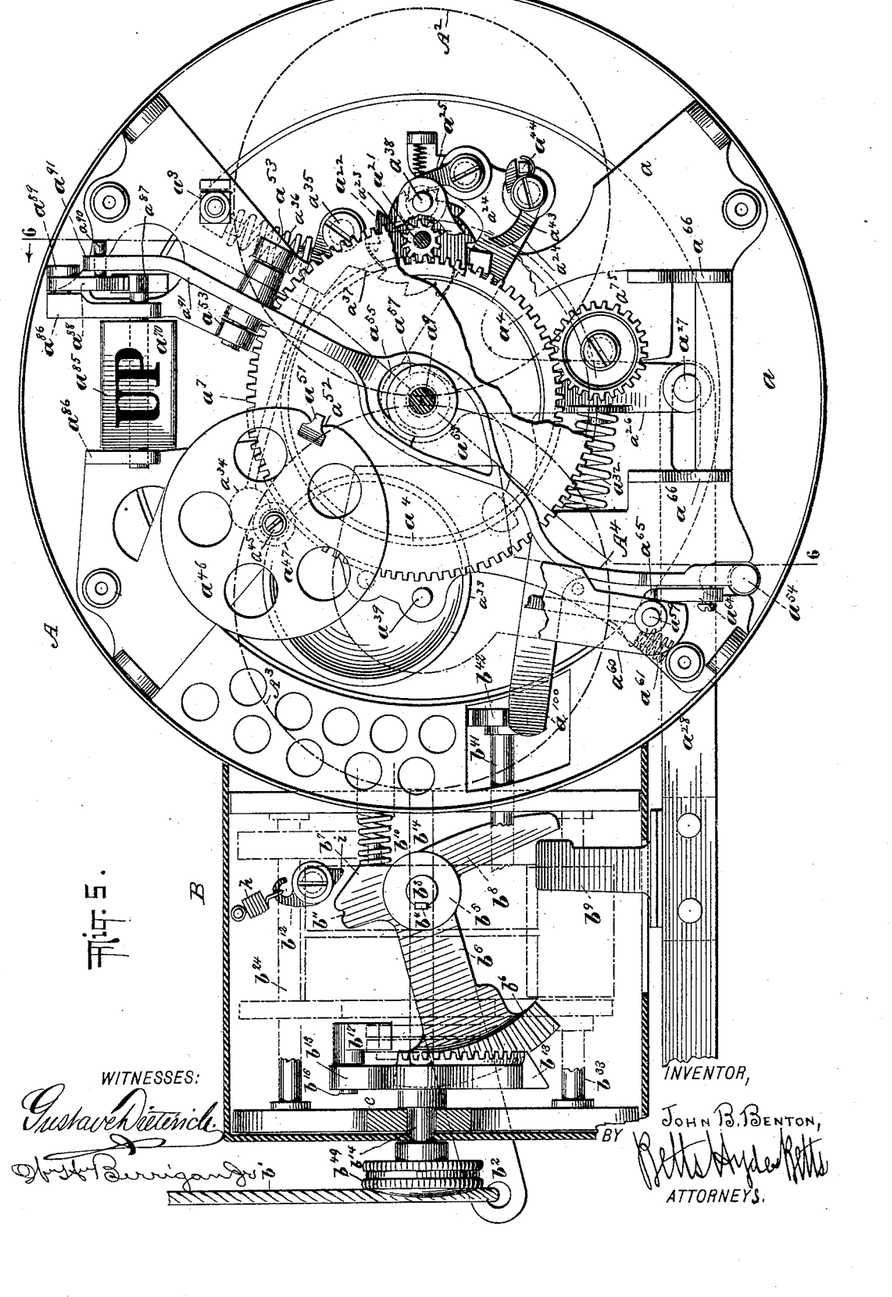
Fig. 5 is a front elevation showing the face-plates and a portion of the mechanism in the front of the register removed to show the mechanism in the rear.

Referring now to the transfer-section B, which, as before stated, is intended to register only transfers, the mechanism thereof is constructed and operates as follows:

B' designates a base-plate secured in any appropriate manner to the rear plate $a'$ of the section A, or, if preferred, cast integral therewith. On a short shaft $b^3$, which extends through and has a bearing in the base-plate, is secured a segmental gear $b^6$, which meshes with a corresponding segment $b^{13}$, loosely mounted on a horizontal shaft $b^{14}$, supported in forwardly-extending lugs or ears $c$ $c$, formed on or attached to the base-plate B', and on the rear end of the shaft $b^3$, back of the base-plate, is fixed a lever or crank arm $b^2$, to the outer or swinging end of which is attached a cord or rope $b'$, which constitutes the means for operating the registering mechanism, and which therefore leads to a point on the car where it may be conveniently grasped by the conductor or fare-collector, as usual in registers of this class. The parts thus mounted and connected are held in normal position by a spring $b^{10}$, acting against an arm $b^7$ of the segment $b^6$, as shown in Fig. 5.

B$^3$ B$^4$ designate two register-wheels rotatably mounted in juxtaposition on the shaft $b^{14}$. These wheels constitute the trip-register—that is, the register which registers the transfers taken in any trip. They each carry on their peripherical surfaces the nine digits or numerals and a cipher, evenly spaced and running in numerical order in the same direction on both wheels. The right-hand or units wheel B$^3$ has connected with it a sleeve which extends loosely through the tens-wheel B$^4$ and is provided at the left of the latter with a ratchet-wheel $b^{18}$, which is actuated by a pawl $b^{17}$, carried by an arm $b^{15}$ of the segment $b^{13}$, whereby a step-by-step rotary movement is imparted. The ratchet-wheel $b^{18}$ has ten teeth, and the throw of the pawl-carrying arm $b^{15}$ is such that the ratchet-wheel and the register-wheel connected therewith are turned through one-tenth of a rotation at each impulse, whereby the numerals on the register-wheel are brought successively into view through a sight-opening $s$ in the front or face plate of the inclosing-case.

At the right-hand side of the register-wheel $D^3$ and connected therewith is a plain wheel or collar $b^{20}$, and beyond the latter, fixed on the shaft $b^{14}$, is a one-tooted ratchet-wheel $r$, which is engaged by a pawl at the side of the wheel or collar $b^{20}$, whereby the register-wheel $B^3$ is made fast on the shaft $b^{14}$ when the latter is turned in a forward direction. The arrangement is such that the register-wheel may, however, turn forward independently of the shaft.

Supported in suitable bearings above the register-wheels $B^3$ $B^4$ is a shaft $b^{24}$, which has rigidly mounted on it a scalloped wheel $b^{22}$ and a gear-wheel $b^{25}$. (See Figs. 2, 9, and 10.) The scalloped wheel $b^{22}$ is the counterpart of the wheel $a^{48}$ of the cash-section A, and the wheel $b^{20}$ corresponds with the wheel $a^{46}$ of said cash-section. It will therefore be sufficient to say in this connection that the said wheels $b^{22}$ $b^{20}$ co-operate to impart a step-by-step movement to the scalloped wheel $b^{22}$, its shaft $b^{24}$, and the gear-wheel $b^{25}$ in precisely the same manner that the wheels $a^{46}$ $a^{48}$ of the cash-section co-operate to effect a similar movement. At the left-hand side of the register-wheel $B^4$ and connected therewith is a gear-wheel $b^{26}$, with the same number of teeth as the wheel $b^{25}$, with which it is in gear.

The operation of the mechanism of the transfer-section thus far described is as follows: The segment $b^6$ being operated by a pull on the cord $b'$, motion is imparted to the register-wheel $B^3$ through the segment $b^{13}$, and its pawl $b^{17}$, acting upon the ratchet-wheel $b^{18}$. Each pull on the cord turns the ratchet-wheel forward one step, corresponding to one-tenth of a rotation, so that its numerals are brought successively into view through the sight-opening. On the completion of a full rotation of the register-wheel $B^3$—that is, in the last step which completes the rotation—the scalloped wheel $b^{22}$, its shaft $b^{24}$, and the gear-wheel $b^{25}$ will be turned forward one step or one-tenth of a rotation, whereby the tens register-wheel $B^4$ will also be turned forward a corresponding distance, and the first numeral thereon brought into view through the sight-opening simultaneously with the cipher on the units-wheel $B^3$, the register then registering ten transfers. In like manner on the completion of each subsequent rotation of the units-wheel the tens-wheel will be turned forward one step, bringing the numerals thereon into view in succession simultaneously with the cipher on the units-wheel until a full rotation of the tens-wheel is completed, when the registering capacity will be exhausted and a new registration will begin. It is calculated that in ordinary use the capacity of this transfer-register will seldom, if ever, be exhausted. Should this, however, occur, the registration would simply be continued, there being nothing to prevent a continuous operation until the lever $A^4$ is thrown forward preparatory to setting the trip-register of section A back to zero, as above explained. When this is done, the transfer-register is locked and rendered inoperative through connections controlled by lever $A^4$, and it is then necessary to reset the transfer-register to zero before it can be further operated. These locking connections and the means for resetting the transfer-register to zero will now be explained.

In the back of the transfer-register, below the register-wheels $B^3$ $B^4$ and parallel with the axis thereof, is a shaft $b^{41}$, which projects into the cash-section A (see Fig. 5) and is provided at its end with a forwardly-projecting arm $b^{42}$, which stands in engagement with an arm $a^{100}$ of lever $A^4$, whereby it is held normally in elevated position. This shaft $b^{41}$ also carries a dog $b^{43}$, rigidly mounted thereon and provided at its free or swinging end with an angular point or tooth $d$, which engages and controls a disk or wheel $b^{47}$, rigidly fixed on the shaft $b^{14}$, which forms the axis of the register-wheels. The said disk or wheel has in its edge a notch $b^{48}$, in which the tooth $d$ engages to hold the disk and its shaft against rotation, and it is also provided with any preferred number of teeth, (four being shown in the drawings,) which project forward in the direction of rotation. (See Fig. 9.)

Figure 9:
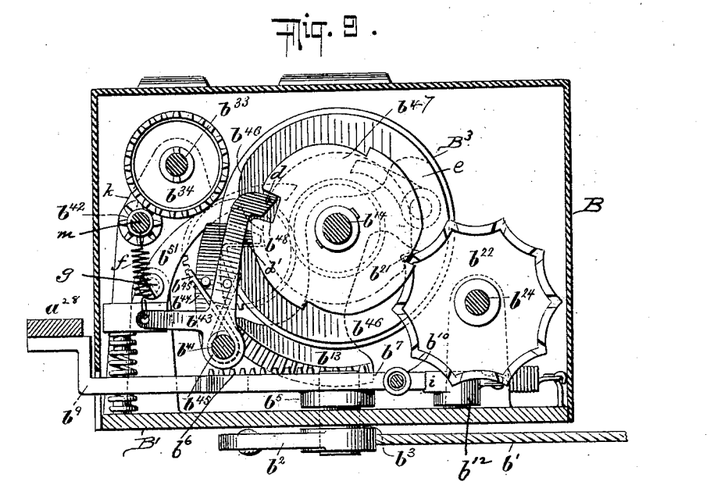
Fig. 9 is a vertical section from front to rear through the transfer-section on the line 9 9 in Fig. 2, looking toward the left.
Figure 10:
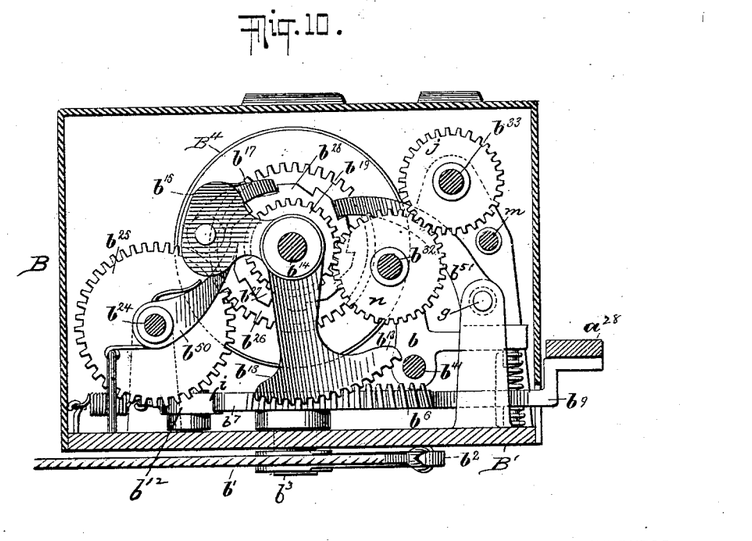
Fig. 10 is a similar view on the line 10 10, looking toward the right.
Figure 12:
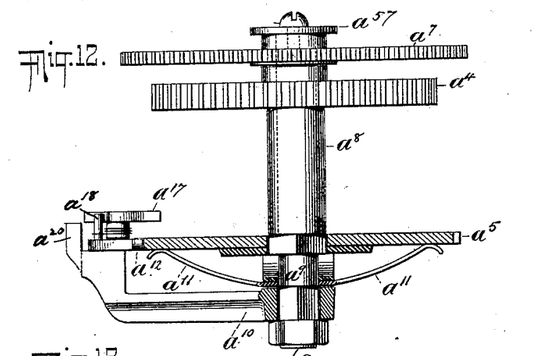
Fig. 12 is a side view of the central gearing for actuating the trip-registering dial-plates of the cash-section.

At the side of each of the register-wheels $B^3$ $B^4$ and connected therewith is a concentric-disk $e$, provided in its edge with a notch, the front side of which is radial and the rear side rounded into a cam $b^{46}$. (See Fig. 9.) In front of each of these disks—that is, in the same plane therewith—is a spring-pressed dog $b^{44}$, mounted on the shaft $b^{41}$ and provided with an angular point or tooth $d'$, adapted to enter the notch in the disk. These dogs (of which only one is shown in the drawings) are united by a sleeve, through which the shaft $b^{41}$ extends loosely, so that they partake of the same swinging or vibrating movements. The notches in the two disks $e$ are so arranged relatively to the numerals on the respective register-wheels that when the latter are both in the zero position the said notches will be in the same radial plane and the points or teeth of the two dogs $b^{44}$ will then rest therein, as shown. When the register is operated, the first forward movement of the units-wheel and its connected disk causes the cam $b^{46}$ of the latter to throw the dogs outward, and they will then remain in this outward position until the tens register-wheel $B^4$ completes a full rotation, at which time the two register-wheels will return to the zero position together, the two notches in the two disks $e$ $e$ will be in coincidence or in the same radial plane, and the teeth $d'$ of the two dogs $b^{44}$ will enter the same. The dogs $b^{44}$ are actuated by one arm of a spring $b^{45}$, coiled around the shaft $b^{41}$, the opposite arm of said spring acting in the opposite direction on the dog $b^{43}$, with a constant tendency to throw the latter out of engagement with the disk $b^{47}$. The tension of the spring $b^{45}$ is, however, so regulated that when the dogs $b^{44}$ are in their inward position, as shown in Fig. 9, the outward pressure on the dog $b^{43}$ will be overcome by a spring $f$, acting on said dog to throw it into action. When the dogs $b^{44}$ are thrown outward, as above explained, the tension of the spring $b^{45}$ is increased beyond that of spring $f$, and the dog $b^{43}$ will then also be thrown out of engagement with the disk $b^{47}$ as soon as the arm $b^{42}$ is released by throwing the lever $A^4$ forward. A spring-pressed arm $b^{51}$, pivoted at $g$, bears upon the teeth of the ratchet-wheel $b^{18}$ and forms a friction-stop to prevent overrotation of the latter and the units register-wheel connected therewith, as above explained. The shaft $b^{14}$ extends out to the exterior of the inclosing-case and is provided on its projecting end with a knob or button $b^{49}$, whereby it is adapted to be turned by hand in the operation of resetting to zero, which operation will now be explained.

Supposing the register to have been operated during a trip to an intermediate point in its capacity—say, for instance, till seventy transfers have been registered—as indicated in Fig. 1, the point of the dog $b^{44}$, acting in connection with the disk $e$ on the tens register-wheel, will rest on the periphery of said disk, and the two dogs $b^{44}$ will be held thereby in their outward position. The full tension of the spring $b^{45}$ will then be applied to the dog $b^{43}$ to throw the latter out of engagement with the disk $b^{47}$; but such disengagement will be prevented by the arm $b^{42}$ of shaft $b^{41}$, which, being in engagement with arm $a^{100}$ of lever $A^4$, locks the shaft $b^{41}$ against backward rotation and prevents the dog from swinging outward, it being remembered that the dog is fast on the shaft. Now when the lever $A^4$ is pressed forward preparatory to resetting the trip-register of section A, as hereinbefore explained, the arm $a^{100}$ will be carried out from under the arm $b^{42}$, leaving the latter free to drop and the dog $b^{43}$ to be thrown out of action by the spring $b^{45}$, and also leaving the disk $b^{47}$ and the shaft $b^{14}$, on which it is fixed, free to be rotated. The operator now takes hold of the knob or button $b^{49}$ and turns the shaft forward, whereby, through the action of the toothed wheel $r$, fixed on the shaft, and the pawl mounted on the wheel or collar $b^{20}$, which latter is connected with the units register-wheel, the said register-wheel is made fast on the shaft and is caused to turn therewith. The forward rotation of the shaft is continued until the two register-wheels reach the zero position together—that is, till the tens-wheel has completed a full rotation—when the notches in the two disks $e\,e$ will be in coincidence or in the same radial plane, and the two dogs $b^{44}$ will drop thereinto. When this occurs, the force with which the spring $b^{45}$ acts on the dog $b^{43}$ to throw it out or away from the disk $b^{47}$ will be so much reduced that the dog will be thrown into action by the spring $f$, and the parts will then be locked against further rotation. Simultaneously with the return of the dog $b^{43}$ into engagement with the disk $b^{47}$ the arm $b^{42}$ will return to its position above the arm $a^{100}$ of lever $A^4$ and permit the latter to move back to its normal position under the influence of the springs $a^{11}$, as already explained, whereby connection between the actuating mechanism and the trip-registering mechanism of section A is re-established. Both sections of the register are now in operative condition ready for the next trip.

The end of arm $b^{42}$ has a bent or inclined portion within the range of movement of the arm $a^{100}$ of lever $A^4$, which necessitates the resetting of the register-wheels $B^3\,B^4$ to zero before the lever $A^4$ is released after being thrown forward to break connection, as otherwise the arm $a^{100}$ will come in contact with said bent or inclined portion of arm $b^{42}$, whereby not only the return of lever $A^4$ to normal position is prevented, but the arm $b^{42}$ is raised and the dog $b^{43}$ thrown against the disk $b^{47}$, the teeth on the latter then preventing the rotation of shaft $b^{14}$ to reset the register, as above explained.

It has hereinbefore been stated that the registering mechanism of the cash-section A is adapted to be operated independently of the transfer-section B—that is, without operating the latter—but that the two sections are so connected that when the transfer-section is operated to register a transfer the cash-section is also operated in conjunction therewith, the result or effect of which is that the transfers are registered by both sections, while the cash fares and regular tickets are registered by the cash-section only. The connections between the two sections whereby this is effected are as follows: On the hub of segment $b^6$ is a radial arm $b^8$, which stands behind an arm $b^9$ on the sliding bar $a^{28}$, and when the transfer-register is operated actuates said bar and operates, also, the registering mechanism of section A, connected therewith; but when section A is operated by turning the shaft $a^{30}$ there is no co-operation between the two arms $b^8\,b^9$, and the transfer-section is therefore not operated.

With the view of compelling an effectual operation of the transfer-register, I provide means which require the actuating parts thereof to be moved to the full limit of movement at each operation, and which, in case they are not properly operated, engages and holds them in inoperative condition.

The means referred to are as follows: The hub of segment $b^6$ is provided with a radial arm $b^7$, the end of which is notched, as at $b^{11}$, Fig. 5, and on the base-plate B′, at a point between the limits of movement of said arm, is pivotally mounted a detent $b^{12}$, which is yieldingly held in position by a spring $h$, which permits it to turn in either direction. The point or tooth $i$ of this detent projects into the path of movement of the end of the arm $b^7$, so that it is engaged and turned aside by the latter both in the forward and backward movements. If the segment be turned to the full limit of its movement, so as to effectually operate the registering mechanism, the arm $b^7$ will entirely pass the detent and will then be free to return to normal position, turning the detent aside in the return movement; but if it be operated to a less extent the detent will engage in the notch $b^{11}$ and prevent a return of the parts to normal position, thus rendering the register inoperative until the full movement of the segment is completed.

The transfer-section B is also provided with a total or permanent registering mechanism for registering the aggregate number of transfers registered by the trip-register in successive trips. This total register is connected with and operated by the actuating devices of the trip-registering mechanism as follows: On the shaft $b^{14}$, at the side of the ratchet-wheel $b^{18}$, is loosely mounted a ratchet-wheel $b^{28}$, which is the exact counterpart of the wheel $b^{18}$ and is actuated simultaneously therewith by the same pawl $b^{17}$, so that the same angular movement (one-tenth of a rotation) is imparted to both of said ratchet-wheels at each stroke of the pawl.

Connected with the ratchet-wheel $b^{28}$ is a gear-wheel $b^{19}$, which meshes with a similar wheel $n$, mounted on a stud or pintle $b^{32}$, projecting from the lug or ear $c$, (see Fig. 2,) and this wheel $n$ meshes in turn with a gear-wheel $j$, fixed on a shaft $b^{33}$, journaled in the two ears $k\,k$. The intermediate gear-wheel $n$ may be of any preferred size; but the two wheels $b^{19}\,j$ must be of the same size—that is, they must have the same number of teeth—so that they shall be rotated through corresponding angular distances at each operation of the register.

On the shaft $b^{33}$ are four register-wheels $b^{34}$ $b^{35}\,b^{36}\,b^{37}$, which correspond in every respect with the wheels $a^{68}\,a^{69}\,a^{70}\,a^{71}$ of the total register of section A. In this case, however, the units-wheel $b^{34}$ is fast on the shaft $b^{33}$, so that motion is transmitted thereto through the train of gears $b^{19}\,n\,j$, above described, and the shaft on which it is mounted. The tens, hundreds, and thousands wheels $b^{35}\,b^{36}\,b^{37}$ are loose on the shaft and are actuated from the units-wheel $b^{34}$ through a series of cog-wheels $b^{42}$, mounted on an arbor $m$. With the exception of the means and connections for transmitting motion to the units-wheel $b^{34}$ the construction, arrangement, and operation of this registering mechanism are precisely the same as in the case of the total or permanent register of section A, which having been fully described in detail, it is not necessary to repeat the description here. It is sufficient to say that the two mechanisms are substantial duplicates or counterparts of each other and that a description of one will answer for both.

In rear of the actuating-pawl $b^{17}$ is a stop-pawl $b^{50}$, mounted on the shaft $b^{24}$. This pawl engages both of the ratchet-wheels $b^{18}\,b^{28}$ and prevents backward rotation. Without this the drag of the pawl $b^{17}$ on the teeth of ratchet-wheel $b^{28}$, through which the total or permanent registering mechanism is actuated, would be liable to disarrange the latter and create discrepancies between the trip and permanent registers; but by applying means for preventing backward rotation such liability is avoided.

The mechanism of the transfer register or section is inclosed by a rectangular case, made preferably of sheet metal and adapted to be set thereover from the front and secured to the base-plate, being slotted at the outer end for the reception of the shaft $b^{14}$ and in the lower side for the reception of the arm $b^9$ of the sliding bar $a^{28}$. In the face-plate $o$ are two glazed openings or windows $s\,t$, through which the registrations of the trip and permanent registers may be observed.

The foregoing description applies to the preferred form, construction, and arrangement of my register. Many modifications will suggest themselves to the skilled mechanic, and I therefore desire to have it understood that I do not limit myself to the exact details of construction set forth in this specification, and that the claims hereto appended are intended to include and cover obvious mechanical equivalents so long as the principle of operation remains the same.

Having now described my invention, I claim—

1. In a fare register the combination of two registering mechanisms each comprising a permanent register and a re-setable trip-register, for registering two classes of fares, an operating mechanism for each of said registering mechanisms, and a separable connection between said operating mechanisms arranged and adapted to cause the two registering mechanisms to be operated synchronously from, or through, one of said operating mechanisms and to permit one registering mechanism to be operated independently from, or through, its own operating mechanism.

2. In a fare register the combination of two registering mechanisms each comprising a permanent register and a re-setable trip-register, for registering two classes of fares, an angular lever and connections for operating one of said mechanisms, a sliding bar and connections for operating the other of said mechanisms, the said bar having an arm or projection which stands in the path of said lever, whereby, when the lever is operated both registering mechanisms are actuated, and whereby the registering mechanism with which the sliding bar is connected is adapted to be operated independently.

3. In a fare register the combination with the registering devices, and with the mechanism for actuating the same, of the rotatable and longitudinally movable shaft geared with the registering devices and having a radial arm normally in engagement with the actuating mechanism and adapted to be disconnected therefrom by the longitudinal movement of its shaft, a circular flange on the frame of the register, and a spring latch on said radial arm adapted, when the arm is disconnected from the actuating mechanism, to engage said flange and prevent a return to operative position, said flange having a notch located, and adapted, to permit the said latch to pass therethrough and the arm to return to normal or operative position when the register is set to zero.

4. The combination of two rotary dial plates, one having thereon a series of units characters and the other a series of tens and a series of hundreds characters, a movable plate arranged and adapted to cover and uncover the hundreds characters, means for holding said plate in position to cover the hundreds characters, and means for moving it to uncover and expose said characters at the beginning of a hundreds registration.

5. In a fare register the combination of two rotary dial plates mounted side by side and adapted to be rotated step-by-step, the right hand dial having a single row of numerals representing units and the left hand dial having a double row of numerals representing tens and hundreds, means for rotating the units dial step by step, means for rotating the tens and hundreds dial one step on the completion of a full rotation of the units dial, a movable plate which normally covers the hundreds numerals, and means for moving said plate to uncover and expose the hundreds numerals at the beginning of a hundreds registration.

6. In a register the combination of a rotary dial plate having thereon two series of numerals arranged in circular and concentric rows, one row within the other, and a movable plate adapted to be set in different positions to cover or expose the numerals of one series, as and for the purpose described.

7. In a register the combination of a rotary dial plate having thereon two series of numerals arranged in circular and concentric rows, one row within the other, a movable plate adapted to be set in different positions to cover or expose the numerals of one series, means for normally holding said plate in position to cover the numerals of one series, and an arm on the dial plate arranged and adapted to move said plate at a predetermined point in the rotation of the dial to uncover and expose said numerals.

8. In a fare register the combination of a registering mechanism, an operating mechanism connected therewith, a separable connection in said operating mechanism for rendering the latter inoperative, means for breaking said connection, a second registering mechanism for registering a different class of fares, an operating mechanism connected therewith, and devices operated by said second registering mechanism to prevent said broken connection from being restored to operative condition until said second registering mechanism has been re-set to zero.

9. In a fare register the combination of a registering mechanism, an operating mechanism connected therewith, a separable connection in said operating mechanism, means for breaking said connection, means for maintaining said broken connection until the registering mechanism has been re-set to zero, a second registering mechanism and devices for actuating the same, and a device actuated by said second registering mechanism and operating to prevent said broken connection from being restored until the second registering mechanism has been re-set to zero.

JOHN BRADBURY BENTON.

Witnesses:
DICKINSON W. RICHARDS,
CURTIS R. HATHAWAY.